United States Patent
Sano et al.

(10) Patent No.: US 10,683,813 B2
(45) Date of Patent: Jun. 16, 2020

(54) ROTARY-TYPE THROTTLING DEVICE FOR INTERNAL COMBUSTION ENGINE

(71) Applicant: HONDA MOTOR CO., LTD., Tokyo (JP)

(72) Inventors: Takahiro Sano, Wako (JP); Takuya Nakano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 199 days.

(21) Appl. No.: 15/687,785

(22) Filed: Aug. 28, 2017

(65) Prior Publication Data

US 2018/0080391 A1 Mar. 22, 2018

(30) Foreign Application Priority Data

Sep. 22, 2016 (JP) .................................. 2016-184936

(51) Int. Cl.
*F02D 9/16* (2006.01)
*F02M 9/08* (2006.01)
(Continued)

(52) U.S. Cl.
CPC ................ *F02D 9/16* (2013.01); *F02D 9/02* (2013.01); *F02D 9/08* (2013.01); *F02D 9/1055* (2013.01);
(Continued)

(58) Field of Classification Search
CPC .... F02D 31/005; F02D 9/1055; F02D 9/1095; F02D 9/16; F02M 35/10255; F02M 69/32; F02M 3/08; F02M 9/02; F16K 11/0853
See application file for complete search history.

(56) References Cited

U.S. PATENT DOCUMENTS 5,343,841 A * 9/1994 Hattori .................. F02B 29/083
 123/403
5,377,635 A * 1/1995 Glover .................... F01L 7/025
 123/190.1
(Continued)

FOREIGN PATENT DOCUMENTS

DE 10314629 A1 * 11/2004 .......... F02B 27/0263
JP 2002-070649 A 3/2002

OTHER PUBLICATIONS

190508 Drespling DE10314629 English machine translation.pdf.*
European Office Action, dated Nov. 26, 2018, for European Application No. 17192460.8.

*Primary Examiner* — Carl C Staubach
(74) *Attorney, Agent, or Firm* — Birch, Stewart, Kolasch & Birch, LLP

(57) ABSTRACT

A rotary-type throttling device for an internal combustion engine includes an upstream auxiliary intake passageway formed in a throttle body and having an inlet port held in fluid communication with the atmosphere, and a downstream auxiliary intake passageway formed in a cylindrical valve body of a rotary valve and having an outlet port open at a downstream outer circumferential surface of the cylindrical valve body. The upstream auxiliary intake passageway and the downstream auxiliary intake passageway have a body-side joint fluid communication port and a valve-side joint fluid communication port formed in respective sliding surfaces of the throttle body and the cylindrical valve body and designed to overlap each other to keep the upstream and downstream auxiliary intake passageways and in fluid communication with each other. When the rotary valve is open,
(Continued)

a main intake air stream passing through an intake passageway in the rotary valve flows smoothly for enhanced intake performance without being disturbed by an auxiliary intake air stream flowing out of the outlet port of an auxiliary intake passage.

7 Claims, 12 Drawing Sheets

(51) Int. Cl.
*F02D 9/08* (2006.01)
*F02D 9/10* (2006.01)
*F02D 9/02* (2006.01)
*F02M 35/10* (2006.01)
*F02M 35/108* (2006.01)
*F02M 26/52* (2016.01)
*F02M 35/16* (2006.01)
*F16K 5/04* (2006.01)
*F16K 31/06* (2006.01)

(52) U.S. Cl.
CPC ............ *F02M 9/08* (2013.01); *F02M 35/108* (2013.01); *F02M 35/10255* (2013.01); *F02D 2009/0205* (2013.01); *F02M 26/52* (2016.02); *F02M 35/162* (2013.01); *F16K 5/04* (2013.01); *F16K 31/0675* (2013.01)

(56) References Cited

U.S. PATENT DOCUMENTS

| | | | | |
|---|---|---|---|---|
| 5,709,822 | A * | 1/1998 | Togashi | F02M 3/08 261/44.2 |
| 6,332,449 | B1 * | 12/2001 | Girard | F02D 9/14 123/190.5 |
| 7,104,252 | B1 * | 9/2006 | Pattullo | F02D 9/16 123/311 |
| 2006/0243245 | A1 * | 11/2006 | Mine | F02D 31/005 123/339.14 |
| 2012/0000438 | A1 * | 1/2012 | Sakagami | F02B 27/0263 123/184.47 |
| 2015/0337717 | A1 * | 11/2015 | Robinson | F02B 37/004 60/602 |

* cited by examiner

ROTARY-TYPE THROTTLING DEVICE FOR INTERNAL COMBUSTION ENGINE

TECHNICAL FIELD

The present invention relates to a rotary-type throttling device to be provided in an intake passage of an internal combustion engine.

BACKGROUND ART

There is known a technology in which a rotary-type throttling device is provided in an intake passage for introducing fresh air into a combustion chamber of an internal combustion engine, so that the combustion chamber is supplied with fresh air when a rotary valve is opened, and in which an auxiliary intake passage is provided in bypassing relation to the rotary valve for supplying fresh air to the intake passage downstream of the rotary valve while the engine is idling with the rotary valve being closed (see, for example, Patent Document 1).

PRIOR ART DOCUMENT

Patent Document

[Patent Document 1]
JP 2002-070649 A
Patent Document 1 discloses a rotary throttle valve carburetor including a rotary valve rotatably supported in a tubular valve chamber provided perpendicularly across an intake passage extending through a carburetor body. The intake passage has an inlet port that is open upstream of the rotary valve and an outlet port that is open downstream of the rotary valve, the inlet port and the outlet port being held in fluid communication with each other by an auxiliary intake passage. A check valve is provided in the auxiliary intake passage for allowing intake air to flow from the inlet port to the outlet port under negative intake pressure.

When the rotary valve is opened, fresh air is supplied through an intake passageway in the rotary valve to the combustion chamber. When the rotary valve is swung to be closed, the check valve is opened under negative intake pressure, allowing fresh air to be supplied through the auxiliary intake passage to the combustion chamber, so that the internal combustion engine can continue idling.

SUMMARY OF THE INVENTION

Problems to be Solved by the Invention

The auxiliary intake passage has its outlet port always open in the intake passage in the carburetor body downstream of the rotary valve. Therefore, when the rotary valve is open, an auxiliary intake air stream flows out irregularly from the outlet port of the auxiliary intake passage under negative intake pressure, or the outlet port of the auxiliary intake passage itself adversely influences on the main intake air stream even in the absence of an auxiliary intake air stream flowing therefrom. Therefore, the auxiliary intake air stream and the outlet port of the auxiliary intake passage itself act on the main intake air stream flowing in the intake passage via the intake hole in the rotary valve, tending to disturb the intake air stream and lower the intake performance.

The present invention has been made in view of the above problems. It is an object of the present invention to provide a rotary-type throttling device in which when a rotary valve is open, a main intake air stream passing through an intake passageway in the rotary valve flows smoothly for enhanced intake performance without being disturbed by an auxiliary intake air stream flowing out of the outlet port of an auxiliary intake passage.

Means for Solving the Problems

To achieve the above object, there is provided in accordance with the present invention a rotary-type throttling device for an internal combustion engine, comprising: a rotary valve including a valve body having a cylindrical body with a longitudinal center axis about which the cylindrical body is swingable between open and closed positions, and an intake hole defined in the cylindrical body and extending perpendicularly across the center axis; and a throttle body having an intake passage defined therein which is held in fluid communication with an intake channel in the internal combustion engine and a cylindrical valve chamber defined therein to extend perpendicularly across the intake passage, the cylindrical valve chamber receiving therein said cylindrical valve body to be rotatable relative to the cylindrical valve chamber; wherein the valve body of the rotary valve is rotatable between an open position in which the intake hole of the rotary valve is brought into fluid communication with the intake passage of the throttle body and a closed position in which an outer circumferential surface of the cylindrical valve body closes the intake passage; characterized in that:

the throttle body has an upstream auxiliary intake passageway defined therein, having an inlet port held in fluid communication with the atmosphere; the cylindrical valve body has a downstream outer circumferential surface and a downstream auxiliary intake passageway defined therein, the downstream auxiliary intake passageway having an outlet port opening at the downstream outer circumferential surface; and the upstream auxiliary intake passageway and the downstream auxiliary intake passageway have a body-side joint fluid communication port and a valve-side joint fluid communication port defined in respective sliding surfaces of the throttle body and said cylindrical valve body, the body-side joint fluid communication port and the valve-side joint fluid communication port being arranged to be capable of overlapping each other for fluid communication with each other.

With this arrangement, the downstream auxiliary intake passageway formed in the cylindrical valve body of the rotary valve has its outlet port at the downstream outer circumferential surface, so that the outlet port of the downstream auxiliary intake passageway is open in the intake passage downstream of the rotary valve in the closed state of the rotary valve. Therefore, even when the rotary valve is closed, fresh air passes through the upstream auxiliary intake passageway and the downstream auxiliary intake passageway and flows from the outlet port into the intake passage downstream of the rotary valve, and is supplied to a combustion chamber to keep the internal combustion engine operating.

When the rotary valve is turned and opened, an auxiliary intake air stream flows out of the outlet port formed in the downstream outer circumferential surface that is separate from the intake hole in the cylindrical valve body. Therefore, the auxiliary intake air stream flowing out of the outlet port does not act directly on a main intake air stream flowing through the intake hole in the cylindrical valve body and the intake passage, and does not disturb the main intake air stream, making the intake air stream smooth for enhanced intake performance.

In a preferred embodiment of the invention, the valve-side joint fluid communication port is formed in an axial side surface of the cylindrical valve body, and the body-side joint fluid communication port is formed in an inner side surface of the tubular valve chamber of the throttle body which is held in sliding contact with the axial side surface.

With this arrangement, the body-side joint fluid communication port and the valve-side joint fluid communication port that provide fluid communication between the upstream auxiliary intake passageway in the throttle body and the downstream auxiliary intake passageway in the rotary valve are formed respectively in the inner side surface of the valve chamber of the throttle body and the axial side surface of the cylindrical valve body of the rotary valve, the inner side surface and the left side surface being held in sliding contact with each other. Therefore, the valve-side joint fluid communication port formed in the axial side surface of the cylindrical valve body of the rotary valve can be freely placed in an optimum position without being affected by the intake hole, on the axial side surface, rather than on the outer circumferential surface in which the intake hole is formed, and the valve-side joint fluid communication port can have a sufficient area for an increased rate of auxiliary intake air.

In a preferred embodiment of the invention, the downstream outer circumferential surface of the cylindrical valve body has a recess defined therein; and the outlet port of the downstream auxiliary intake passageway is open in the recess.

With this arrangement, since the depressed recess is defined in the downstream outer circumferential surface of the cylindrical valve body of the rotary valve, and the outlet port of the downstream auxiliary intake passageway is open in the recess, the auxiliary intake air stream flowing through the downstream auxiliary intake passageway out of the outlet port flows into the recess defined in the downstream outer circumferential surface of the cylindrical valve body. Therefore, any adverse effect that the auxiliary intake air stream has on the main intake air stream flowing through the intake hole in the cylindrical valve body and the intake passage is further reduced, making the intake air stream smooth for enhanced intake performance.

As the outlet port of the downstream auxiliary intake passageway is open in the recess, the passageway length of the downstream auxiliary intake passageway is shortened for smooth fluid communication with the intake passage to stabilize intake performance when the rotary valve has no valve opening, i.e., when the rotary valve is closed, and when the rotary valve has a minute opening.

In a further preferred embodiment of the invention, the recess defined in the downstream outer circumferential surface of the cylindrical valve body is divided into an upstream recess section and a downstream recess section, in an open position of the cylindrical valve body, by a partition rib extending parallel to the center axis; and the outlet port of the downstream auxiliary intake passageway is open in the upstream recess.

With the above arrangement, as the outlet port of the downstream auxiliary intake passageway is open in the upstream recess partitioned by the partition rib, when the cylindrical valve body is turned from the closed state toward the open state, the upstream recess partitioned by the partition rib is progressively closed by the inner surface of the valve chamber in the throttle body and the outlet port that is open in the upstream recess is also closed from an early stage before the rotary valve is fully open, so that the auxiliary intake air stream flowing out of the outlet port is further prevented from acting on and disturbing the main intake air stream flowing through the intake hole in the cylindrical valve body and the intake passage, for further enhancing intake performance.

In a preferred embodiment of the invention, the downstream auxiliary intake passageway of the rotary valve is formed through a solid portion of the cylindrical valve body and provides fluid communication between the valve-side joint fluid communication port and the outlet port.

With this arrangement, the downstream auxiliary intake passageway in the rotary valve is defined through the solid portion of the cylindrical valve body, providing fluid communication between the valve-side joint fluid communication port and the outlet port. Therefore, the downstream auxiliary intake passageway is defined without forming a recess in the outer surface of the cylindrical valve body, so that the cylindrical valve body and the inner surface of the valve chamber in the throttle body are well sealed against each other while at the same time the rotary valve remains highly operative.

In a still preferred embodiment of the invention, the upstream auxiliary intake passageway of the throttle body is combined with an auxiliary intake control valve device for controlling the amount of auxiliary intake air flow therethrough depending on degree of opening of the rotary valve.

With this arrangement, inasmuch as the auxiliary intake control valve device for controlling the auxiliary intake air stream flowing from the outlet port of the downstream auxiliary intake passageway in the rotary valve is provided in combination with the upstream auxiliary intake passageway in the throttle body, the auxiliary intake control valve device can be installed with ease and can be operated stably.

Effects of the Invention

Since the downstream auxiliary intake passageway formed in the rotary valve has its outlet port at the downstream outer circumferential surface of the cylindrical valve body, when the rotary valve is opened, an auxiliary intake air stream flows out of the outlet port formed in the downstream outer circumferential surface that is separate from the intake hole in the cylindrical valve body. Therefore, the auxiliary intake air stream flowing out of the outlet port does not act directly on a main intake air stream flowing through the intake hole in the cylindrical valve body and the intake passage, and does not disturb the main intake air stream, and makes the intake air stream smooth for enhanced intake performance.

MODE FOR CARRYING OUT THE INVENTION

A rotary-type throttling device according to an embodiment of the present invention will be described below with reference to the drawings.

Figure 1:
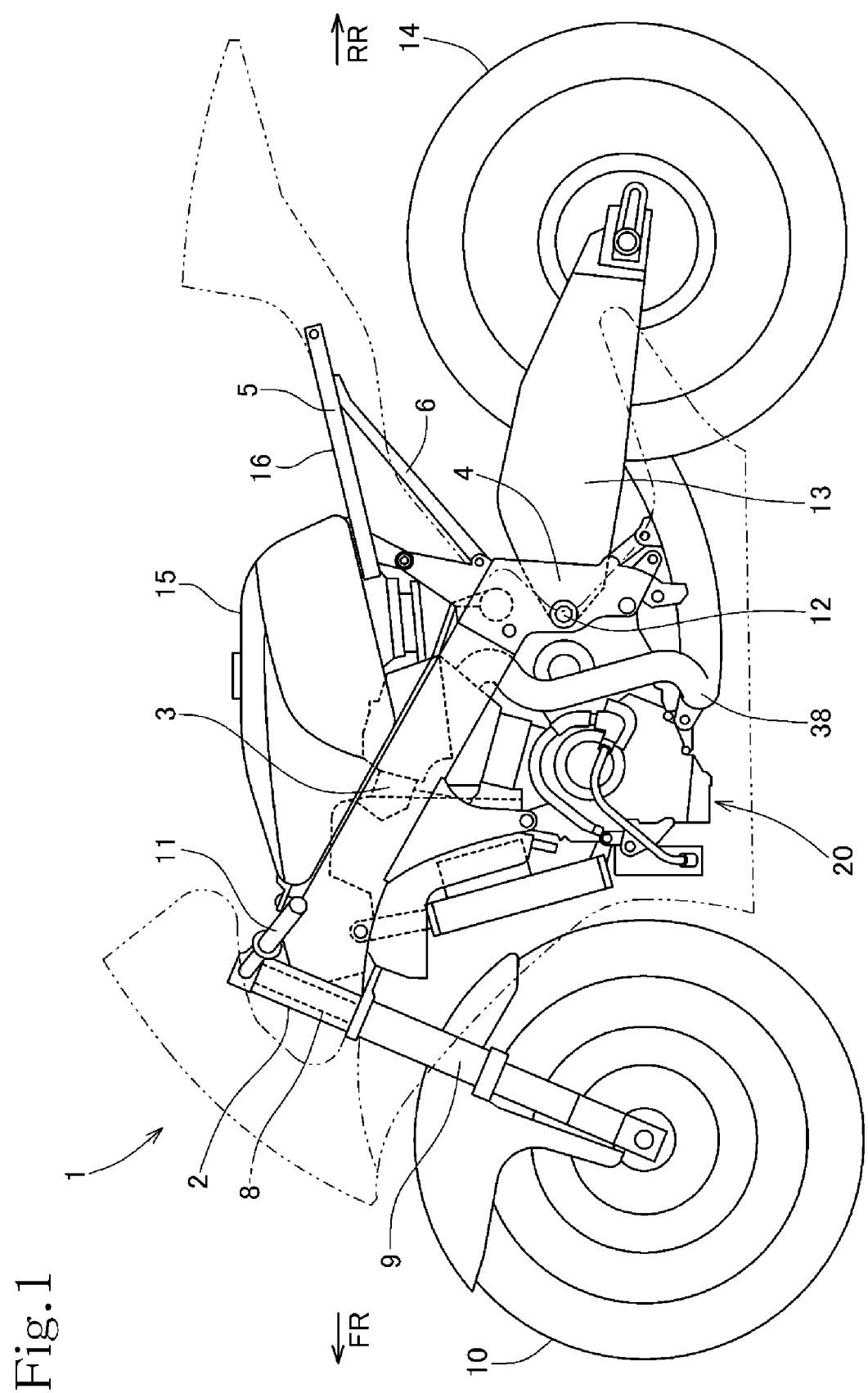
FIG. 1 is a side elevational view depicting a motorcycle in its entirety which has an internal combustion engine incorporating therein a rotary-type throttling device according to an embodiment of the present invention.

FIG. 1 is a side elevational view depicting a motorcycle 1 in its entirety which has an internal combustion engine incorporating therein a rotary-type throttling device according to an embodiment of the present invention.

Directions such as forward, rearward, leftward, and rightward directions referred to in the description that follow are in accord with normal standards for the motorcycle 1 according to the present embodiment whose direction of traveling straight ahead is referred to as a forward direction. In the drawings, the arrow FR represents a forward direction, the arrow RR a rearward direction, the arrow LH a leftward direction, and the arrow RH a rightward direction.

As shown in FIG. 1, the motorcycle 1 has a vehicle body frame including a head pipe 2 on which a steering shaft 8 is angularly movably supported, a pair of left and right main frame members 3 directed leftward and rightward from the head pipe 2 and extending rearward and downward in a rearward direction of the motorcycle 1, a pair of left and right pivot frame members 4 connected to the rear ends of the main frame members 3 and extending downward, a pair of seat rails 5 extending in the rearward direction of the motorcycle 1 from respective upper portions of the pivot frame members 4, and a pair of sub-frame members 6 extending between rear portions of the seat rails 5 and the pivot frame members 4 and joined to the seat rails 5 and the pivot frame members 4.

A front fork 9 extends downward from a bottom bridge on the lower end of the steering shaft 8, and a front wheel 10 is rotatably supported on the lower end of the front fork 9. A handlebar 11 is mounted on a top bridge on the upper end of the steering shaft 8.

A pivot shaft 12 extends between and supported on the left and right pivot frame members 4. A swing arm 13 is pivotally supported on the pivot shaft 12 and extends rearward therefrom. A rear wheel 14 is rotatably supported on the rear end of the swing arm 13 that is vertically swingable about the pivot shaft 12.

An internal combustion engine 20 is suspended by the main frame members 3 and the pivot frame members 4.

A fuel tank 15 is supported on the main frame members 3 and the seat rails 5 above the internal combustion engine 20, and a rider's seat 16 is supported on the seat rails 5 behind the fuel tank 15.

Figure 2:
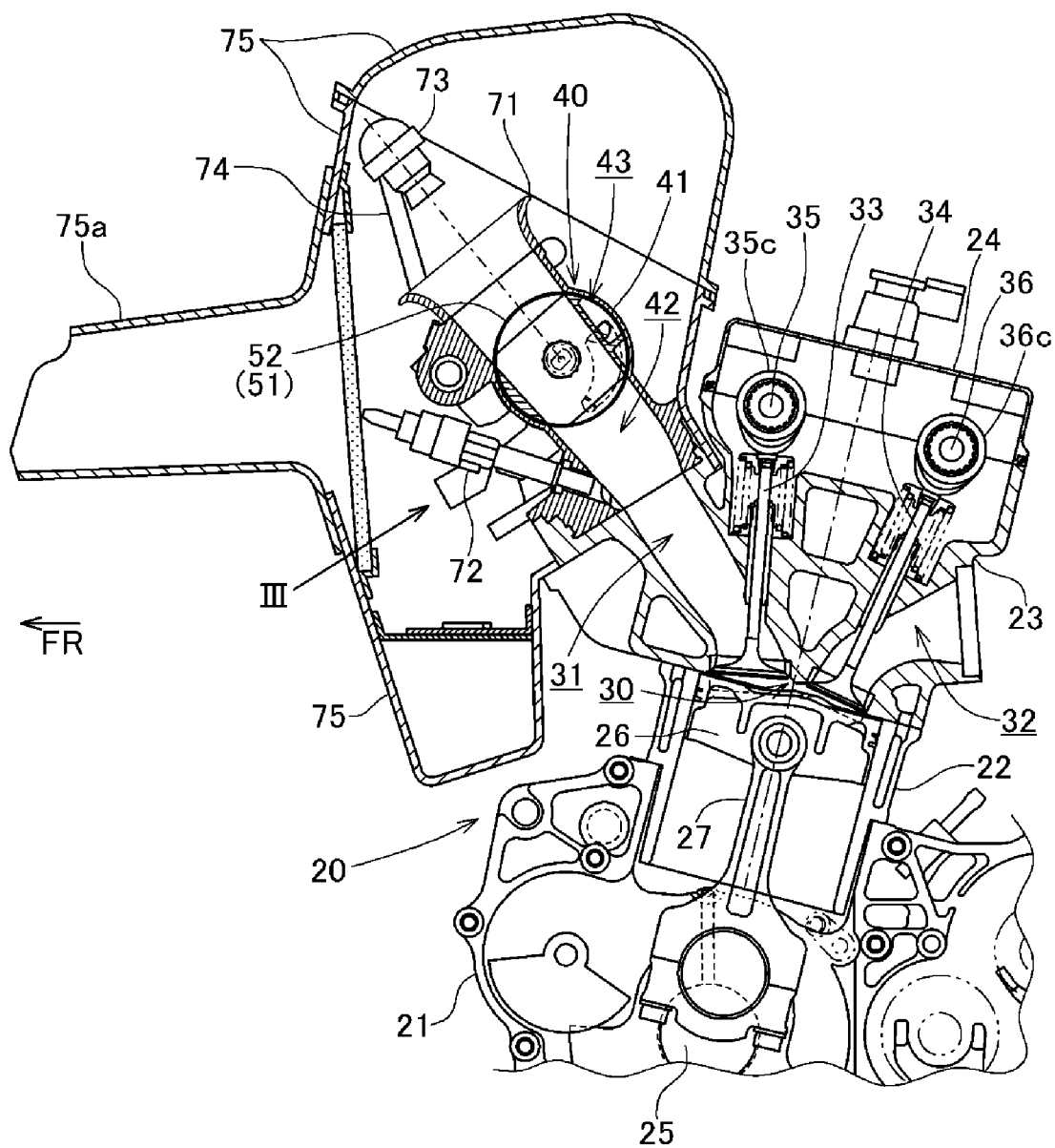
FIG. 2 is a cross-sectional view of an intake system of the internal combustion engine depicted in FIG. 1.

As depicted in FIG. 2, the engine 20 has a cylinder block 22, a cylinder head 23, and a cylinder head cover 24 successively stacked on a crankcase 21 and inclined slightly rearward.

A crankshaft 25 is rotatably supported in the crankcase 21. A piston 26 is slidably fitted in a cylinder bore defined in the cylinder block 22. The crankshaft 25 and the piston 26 are interconnected by a connecting rod 27.

The cylinder head 23 has an intake port 31 and an exhaust port 32 defined therein which extend forward and rearward, respectively, in a curved fashion from a combustion chamber 30 defined in the cylinder head 23 and facing the top surface of the piston 26. The intake port 31 has an opening joined to the combustion chamber 30, which can selectively be opened and closed by an intake valve 33, and the exhaust port 31 has an opening joined to the combustion chamber 30, which can selectively be opened and closed by an exhaust valve 34.

The intake valve 33 is axially moved to open the opening of the intake port 31 when it is pushed by an intake cam 35$c$ on an intake camshaft 35 that is rotated about its own axis. The exhaust valve 34 is axially moved to open the opening of the exhaust port 32 when it is pushed by an exhaust cam 36$c$ on an exhaust camshaft 36 that is rotated about its own axis.

An exhaust pipe 38 (see FIG. 1) is connected to and extends rearward from the exhaust port 32 which is curved rearward from the combustion chamber 30.

A rotary-type throttling device 40 is coupled to the opening of the intake port 31 that is curved obliquely forward and upward from the combustion chamber 30.

The rotary-type throttling device 40 includes a throttle body 41 and a rotary valve 51 rotatably supported in the throttle body 41.

Figure 7:
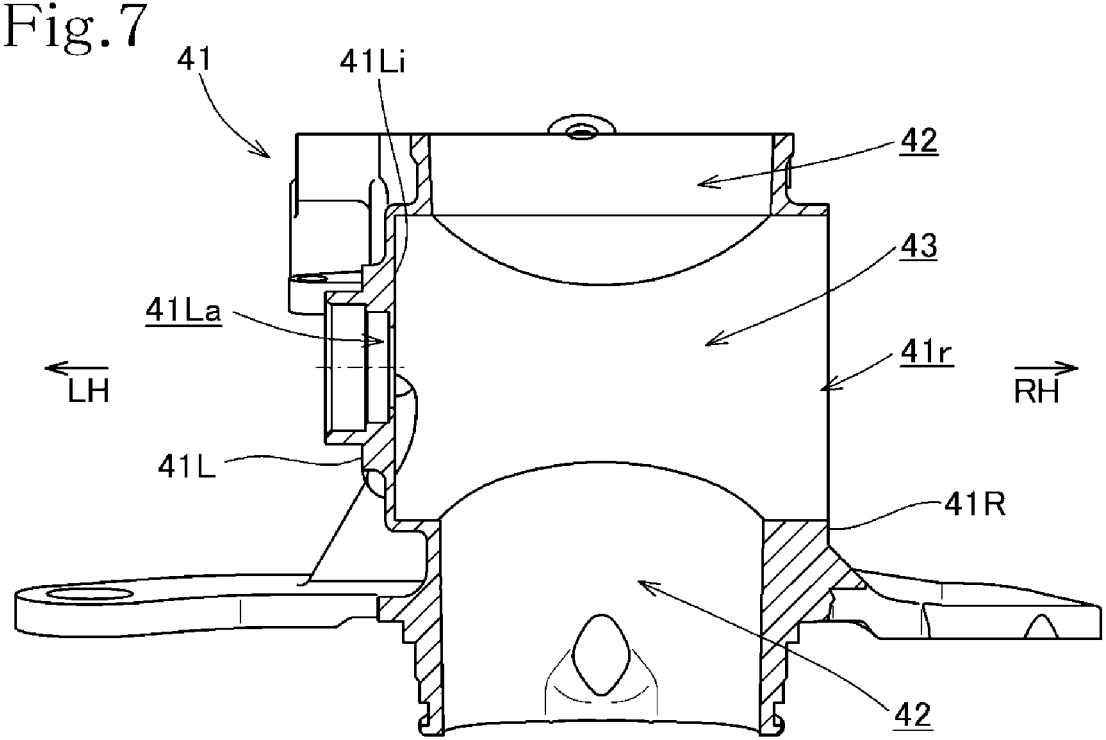
FIG. 7 is a cross-sectional view of the throttle body, taken along line VII-VII of FIG. 4.

The throttle body 41 has an intake passage 42 defined therein which is held in fluid communication with the intake port 31 and oriented obliquely upward, and a cylindrical valve chamber 43 defined therein which extends perpendicularly across the intake passage 42 (see FIG. 7). The rotary valve 51 has a cylindrical valve body 52 rotatably inserted and supported in the valve chamber 43.

As FIG. 2 shows, a funnel 71 is connected to the upstream opening of the intake passage 42 in the throttle body 41.

A first fuel injection valve 72 for injecting fuel into the intake passage 42 mainly in low and medium speed ranges is mounted on the throttle body 41. A second fuel injection valve 73 for injecting fuel into the intake passage 42 mainly in a high speed range is supported on a support rod 74 and disposed above the funnel 71 in alignment with the center axis of the intake passage 42.

The throttle body 41 and the funnel 71 are housed in and surrounded by an intake box 75.

The intake box 75 also houses the second fuel injection valve 73 and includes an intake air inlet port 75a extending forward.

With reference to FIGS. 11 through 15, the cylindrical valve body 52 of the rotary valve 51 is rotatable or angularly movable about a center axis Lc thereof, and has an intake hole 53 defined therein which extends diametrically therethrough perpendicularly across the center axis Lc. The rotary valve 51 has pivot shafts 54L and 54R projecting axially outward from respective left and right side faces 52L and 52R of the cylindrical valve body 52 in alignment with the center axis Lc.

The intake hole 53 that extends diametrically through the cylindrical valve body 52 has an oblong cross-sectional shape that is elongate along the center axis Lc.

The cylindrical valve body 52 has an outer circumferential surface 52S generally divided into two diametrically opposite surfaces by the intake hole 53. One of the divided surfaces is referred to as an upstream outer circumferential surface 52Su that swings in an upstream portion of the intake passage 42, and the other as a downstream outer circumferential surface 52Sd that swings in a downstream portion of the intake passage 42.

Figure 13:
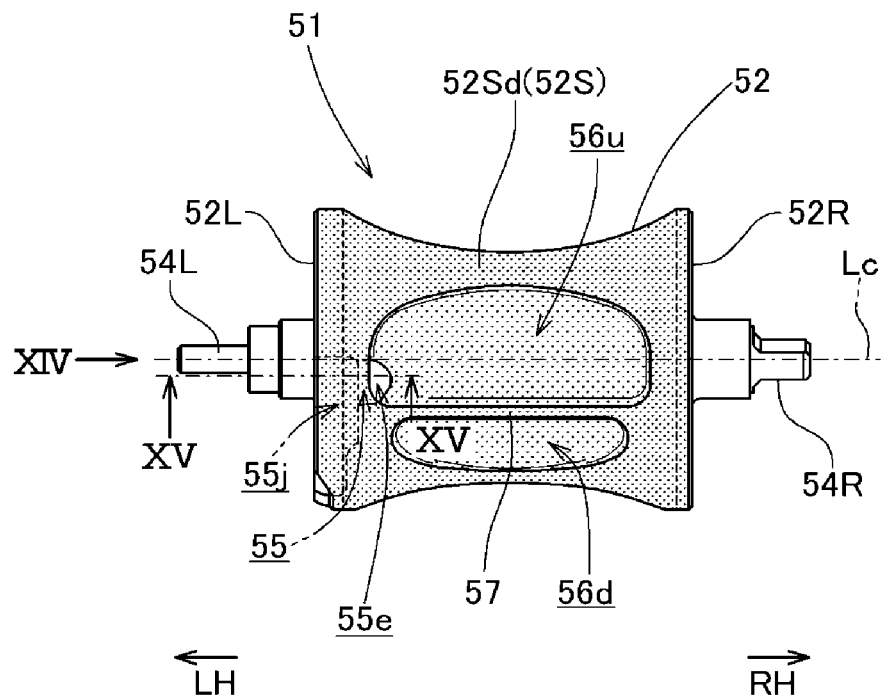
FIG. 13 is a front elevational view of the rotary valve as viewed from a downstream outer circumferential surface thereof.

As depicted in FIG. 13, the downstream outer circumferential surface 52Sd of the cylindrical valve body 52 has an axially elongate recess defined therein which is circumferentially divided into two larger and smaller recesses 56u and 56d by a partition rib 57 extending parallel to the center axis Lc.

Figure 16:
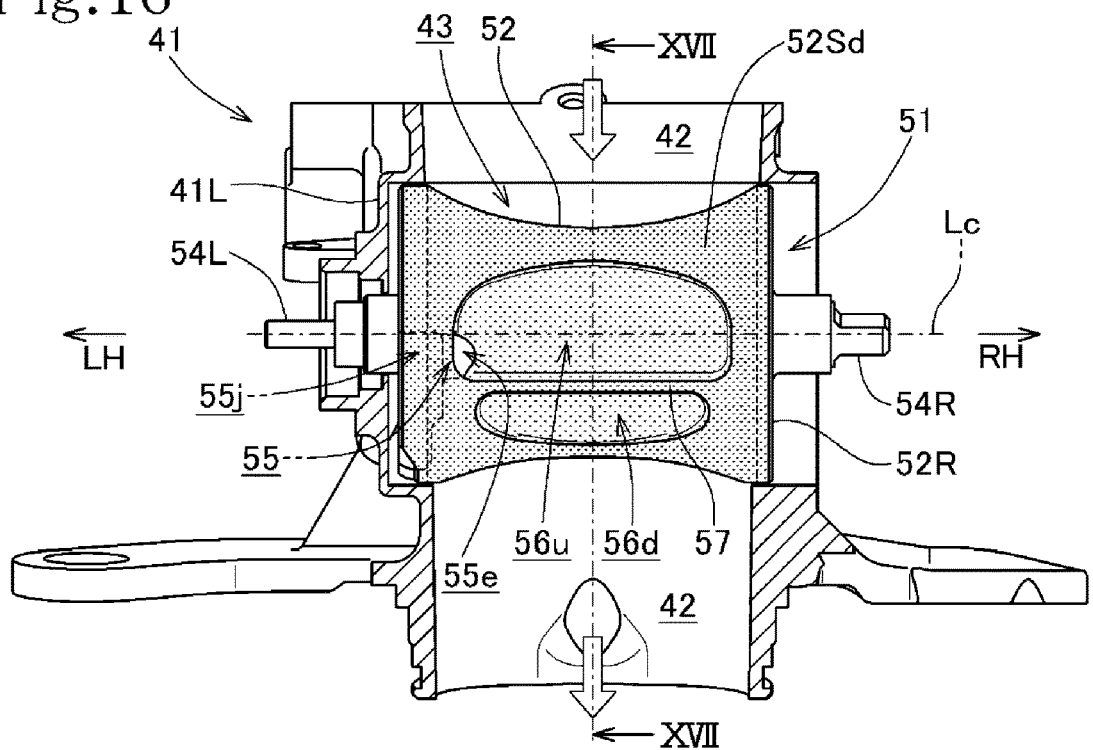
FIG. 16 is a cross-sectional view taken along the same plane as FIG. 7, depicting the rotary-type throttling device at the time the rotary valve is fully open.

As depicted in FIG. 16, which illustrates the rotary valve 51 as fully open, the larger recess 56u serves as an upstream recess 56u that is positioned upstream when the cylindrical valve body 52 is open, and the smaller recess 56d as a downstream recess 56d that is positioned downstream when the cylindrical valve body 52 is open.

In FIGS. 11 through 16 and 18, the outer circumferential surface 52S and the left and right side surfaces 52L and 52R of the cylindrical valve body 52 are depicted stippled with highly dense dots, and the other surfaces including the inner surface of the intake hole 53 and the recessed surfaces of the recesses 56u and 56d are depicted stippled with less dense dots.

Figure 15:
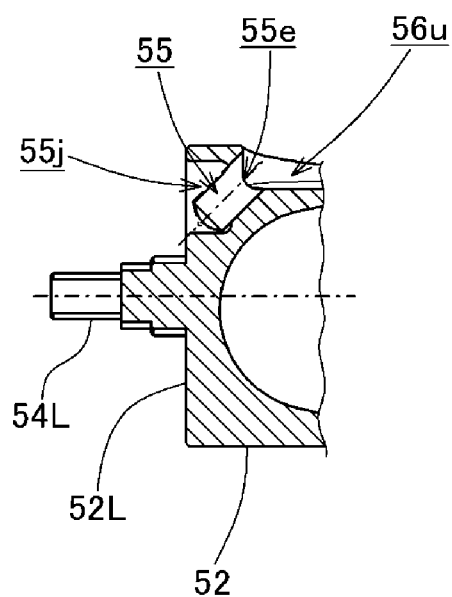
FIG. 15 is a cross-sectional view of the rotary valve, taken along line XV-XV of FIG. 13.

As FIGS. 13 and 15 show, the cylindrical valve body 52 of the rotary valve 51 has a downstream auxiliary intake passageway 55 defined therein through its solid portion near the left side surface 52L. The downstream auxiliary intake passageway 55 has an outlet port 55e that is open in the left end of the upstream recess 56u.

Figure 11:
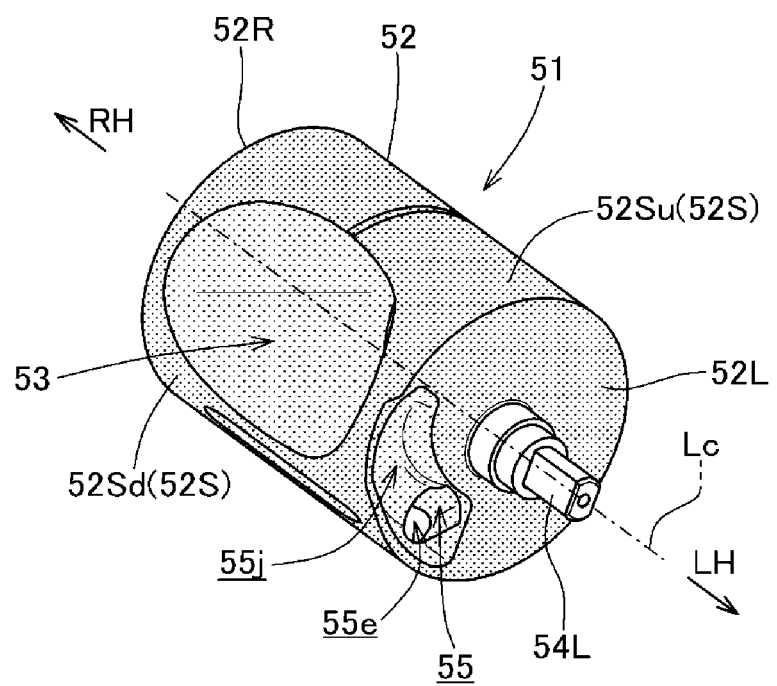
FIG. 11 is a perspective view of a rotary valve of the rotary-type throttling device.
Figure 12:
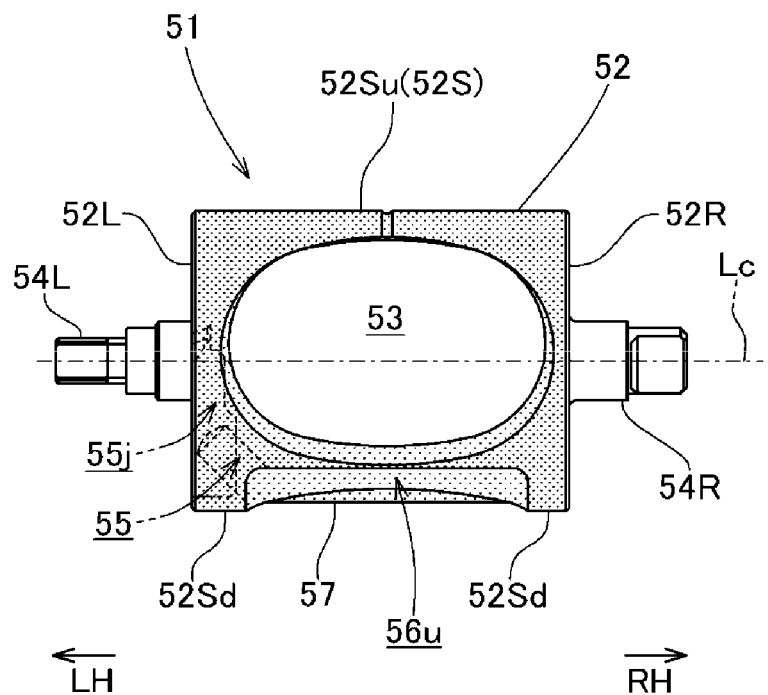
FIG. 12 is a front elevational view of the rotary valve as viewed from an intake hole therein.
Figure 14:
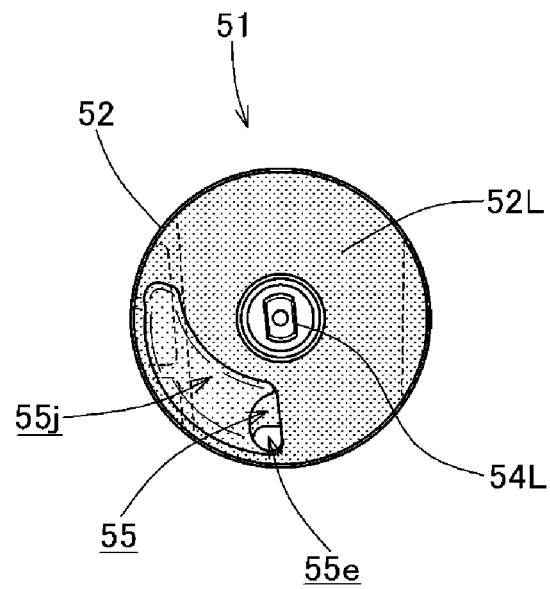
FIG. 14 is a left-hand side elevational view of the rotary valve, taken along arrow XIV of FIG. 13.

The left side surface 52L of the cylindrical valve body 52 has a valve-side joint fluid communication port 55j defined concavely therein along an outer circumferential edge thereof in a modified arcuate shape (see FIGS. 11 and 14). The downstream auxiliary intake passageway 55 linearly interconnects the valve-side joint fluid communication port 55j and the outlet port 55e that is open in the left end of the upstream recess 56u.

Since the valve-side joint fluid communication port 55j is defined in the left side surface 52L of the cylindrical valve body 52 and the outlet port 55e is open in the left end of the upstream recess 56u, the downstream auxiliary intake passageway 55 that interconnects the valve-side joint fluid communication port 55j and the outlet port 55e has an extremely short passageway length (see FIG. 15).

As will be noted from FIG. 2, the first fuel injection valve 72 is mounted on the front surface of the throttle body 41 in which the tubular valve chamber 43 extends perpendicularly across the intake passage 42, and the valve 72 is inclined obliquely to the intake passage 42. The first fuel injection valve 72 injects fuel into the intake passage 42 downstream of the rotary valve 51.

As illustrated in FIG. 7, the valve chamber 43 is hollowed out in a tubular form from a circular opening 41r defined in a right side wall 41R of the throttle body 41 perpendicularly across the intake passage 42 to a left side wall 41L thereof.

The cylindrical valve body 52 of the rotary valve 51 is inserted, as will be seen from FIG. 16, with its left side surface 52L foremost, from the right circular opening 41r in the throttle body 41 into the tubular valve chamber 43, and is rotatably housed in the tubular valve chamber 43.

After the cylindrical valve body 52 is rotatably housed in the tubular valve chamber 43, the circular opening 41r in the right side wall 41R of the throttle body 41 is closed by a disk-shaped lid (not depicted).

The throttle body 41 has an upstream auxiliary intake passageway 45 (see FIGS. 8 and 10) defined therein, which will be described in detail later.

Figure 5:
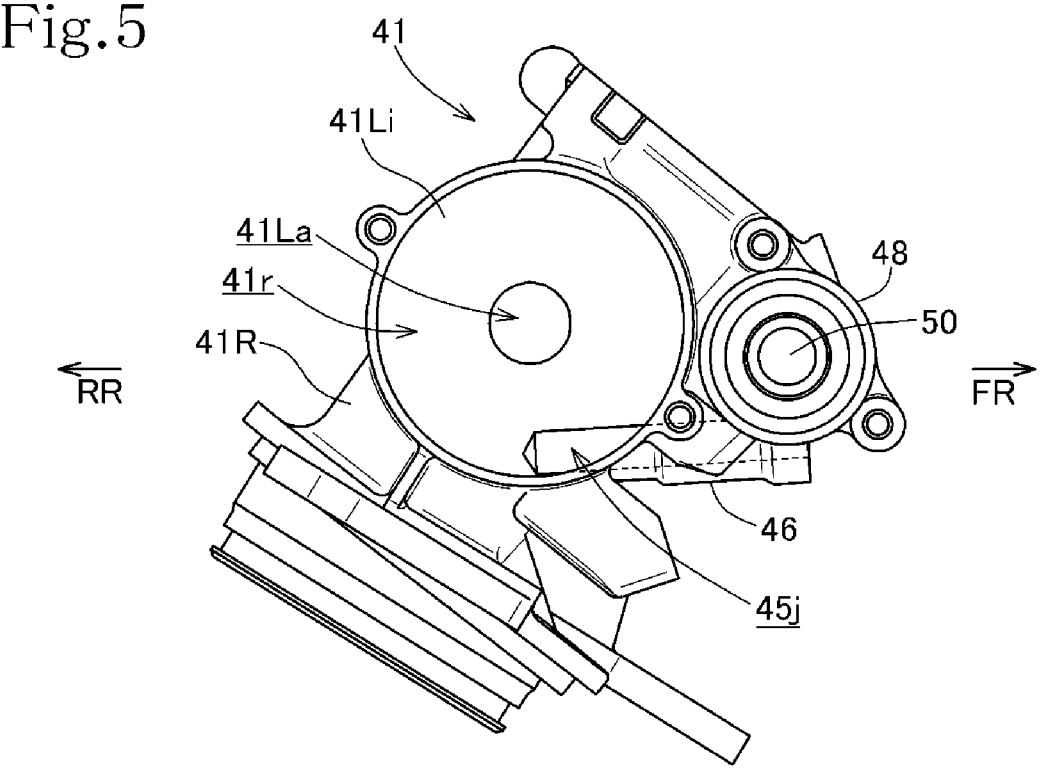
FIG. 5 is a right-hand side elevational view of the throttle body, taken along arrow V of FIG. 3.
Figure 6:
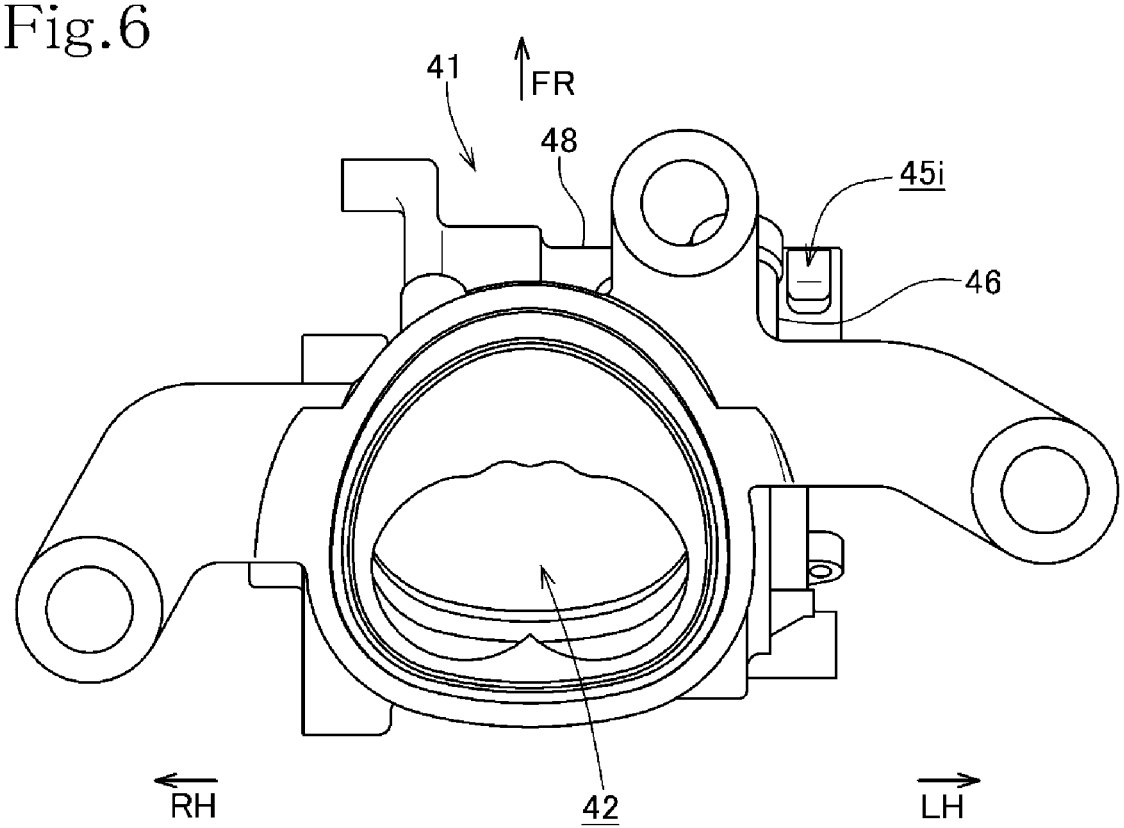
FIG. 6 is a bottom view of the throttle body, taken along arrow VI of FIG. 3.

As depicted in FIG. 5, which is a right-hand side elevational view of the throttle body 41, a circular side surface 41Li, i.e., an inner surface of the left side wall 41L, of the valve chamber 43 is visible through the circular opening 41r in the right side wall 41R of the throttle body 41. The circular side surface 41Li of the valve chamber 43 has a central bearing hole 41La defined therein, and a body-side joint fluid communication port 45j is defined as a semicylindrical groove in the circular side surface 41Li along its circumferential edge.

The body-side joint fluid communication port 45j is provided as a downstream opening of the above-mentioned upstream auxiliary intake passageway 45.

The body-side joint fluid communication port 45j defined as a semi-cylindrical groove in the circular side surface 41Li extends outward into a passage tube 46.

A solenoid valve housing tube 48 that is oriented in leftward and rightward directions across the passage tube 46 is formed on a front side wall of the throttle body 41.

Figure 3:
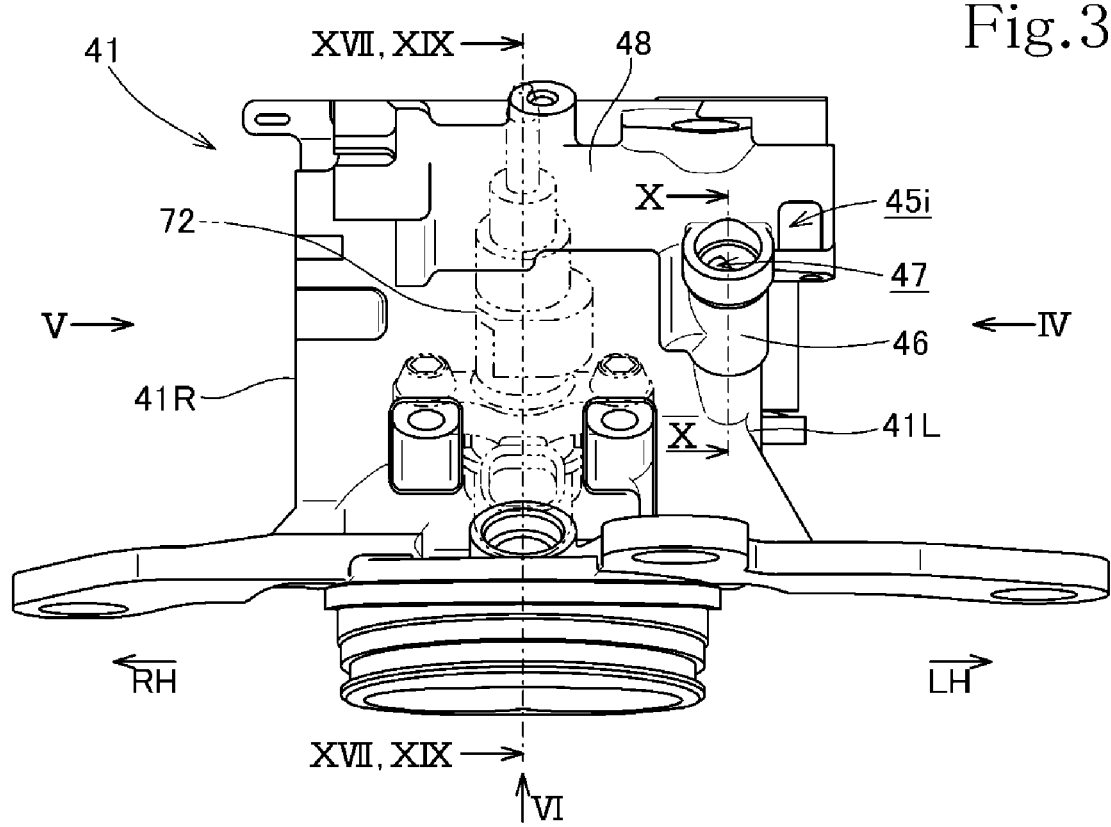
FIG. 3 is a front elevational view taken alone arrow III of FIG. 2, depicting a throttle body of the rotary-type throttling device.
Figure 4:
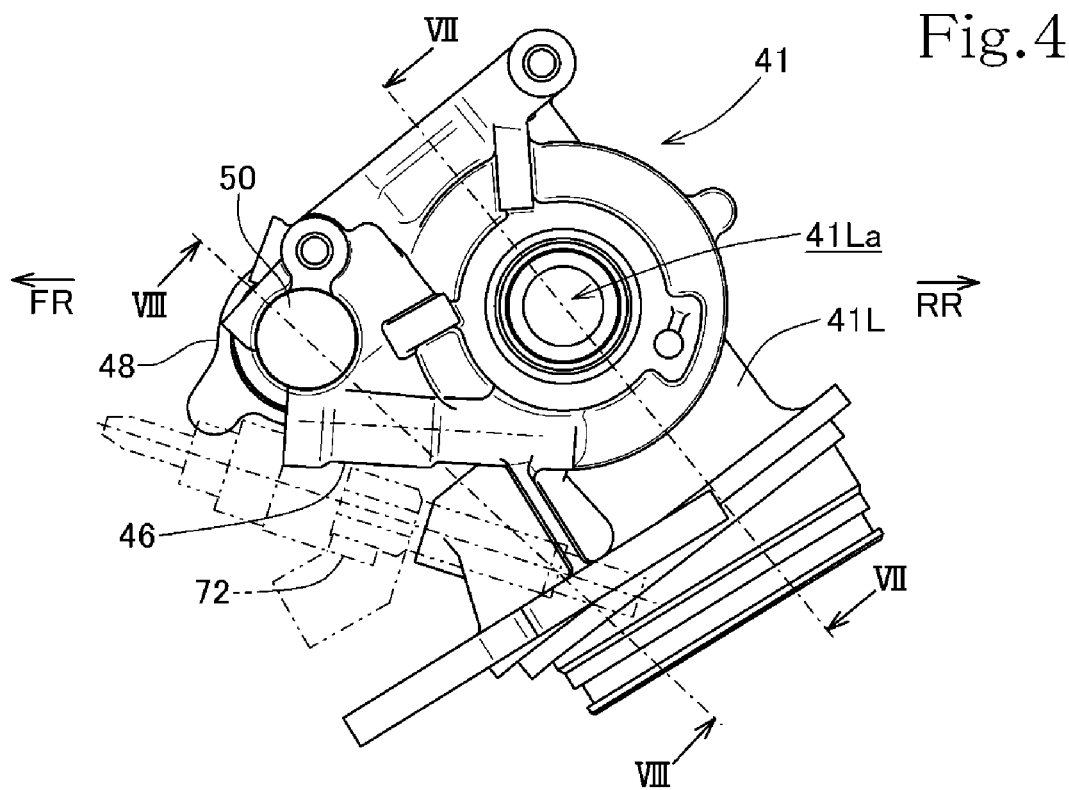
FIG. 4 is a left-hand side elevational view of the throttle body, taken along arrow IV of FIG. 3.
Figure 9:
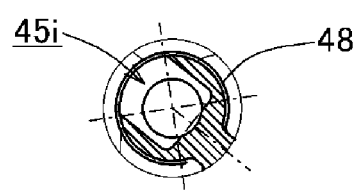
FIG. 9 is a cross-sectional view of the throttle body, taken along line IX-IX of FIG. 8.

As shown in FIGS. 3 and 9, the solenoid valve housing tube 48 has an inlet port 45i defined in its left end and opening forwardly to keep its inner space in fluid communication with the exterior.

Figure 8:
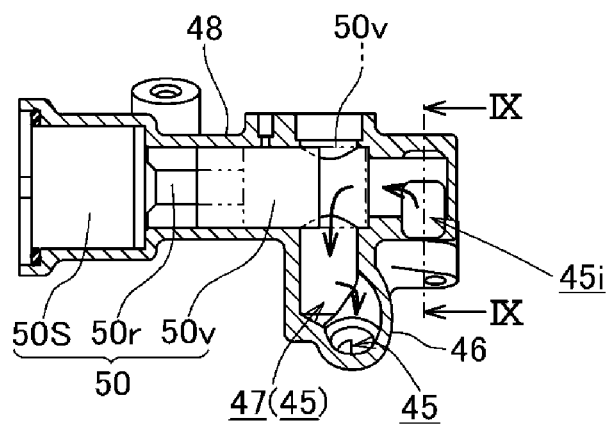
FIG. 8 is a cross-sectional view of the throttle body, taken along line VIII-VIII of FIG. 4.
Figure 10:
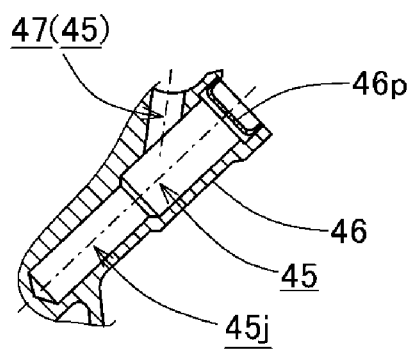
FIG. 10 is a cross-sectional view of the throttle body, taken along line X-X of FIG. 3.

As will be noted from FIGS. 3, 8 and 10, the inner space of the solenoid valve housing tube 48 and the inner space of the passage tube 46 are held in fluid communication with each other slightly rightward off the inlet port 45i by a fluid communication passage 47.

The passage tube 46 has its upper end opening closed by a plug 46p.

The upstream auxiliary intake passageway 45 serves as an auxiliary intake passageway extending from the inlet port 45i that is open outward, through the interior of the solenoid valve housing tube 48, the fluid communication passage 47 and the interior of the passage tube 46, to the body-side joint fluid communication port 45j.

The solenoid valve housing tube 48 forming the upstream auxiliary intake passageway 45 is provided therein with an auxiliary intake control valve device 50 depicted in FIG. 8.

The auxiliary intake control valve device 50 includes an electromagnetic solenoid 50S serving as an actuator and a slidable valve body 50v mounted on the distal end of an extensible/retractable operating rod 50r of the electromagnetic solenoid 50S. When the electromagnetic solenoid 50S is energized, the operating rod 50r is extended or retracted to move the slidable valve body 50v on the distal end of the operating rod 50r slidingly in the solenoid valve housing tube 48.

In FIG. 8, the operating rod 50r is shown as retracted, positioning the slidable valve body 50v closely to the electromagnetic solenoid 50S as indicated by the solid lines. Since the slidable valve body 50v thus positioned opens the upstream opening of the fluid communication passage 47, ambient air drawn in from the inlet port 45i flows through the interior of the solenoid valve housing tube 48 into the fluid communication passage 47, from which the air flows through the passage tube 46 into the body-side joint fluid communication port 45j.

When the operating rod 50r is extended by the electromagnetic solenoid 50S, the slidable valve body 50v is moved away from the electromagnetic solenoid 50S as indicated by the two-dot-and-dash lines in FIG. 8, closing the upstream opening of the fluid communication passage 47. Therefore, the upstream auxiliary intake passageway 45 is blocked.

Depending on the throttle valve opening of the rotary valve 51, the auxiliary intake control valve device 50 selectively opens and blocks the upstream auxiliary intake passageway 45 to control the amount of auxiliary intake air flowing therethrough.

The upstream auxiliary intake passageway 45 in the throttle body 41 has its body-side joint fluid communication port 45j opening as the semicylindrical groove in the circular side surface 41Li, i.e., the inner surface of the left side wall 41L, along its circumferential edge (see FIG. 5). The downstream auxiliary intake passageway 55 in the rotary valve 51 has its valve-side joint fluid communication port 55j opening in the modified arcuate shape in the left side surface 52L along its outer circumferential edge. The left side surface 52L faces, and is held in sliding contact with the inner side surface 41Li of the valve chamber 43 (see FIGS. 11 and 14).

Figure 19:
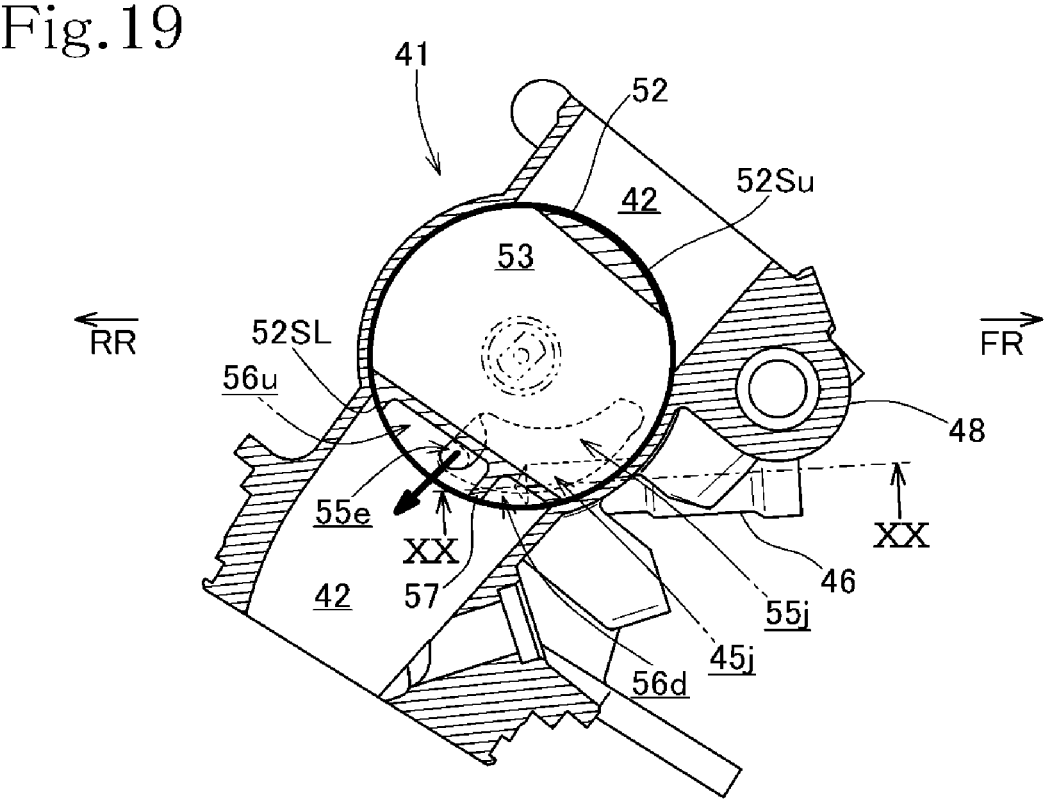
FIG. 19 is a cross-sectional view taken along the same plane as line X-X of FIG. 3, depicting the rotary-type throttling device at the time the rotary valve is fully closed.
Figure 20:
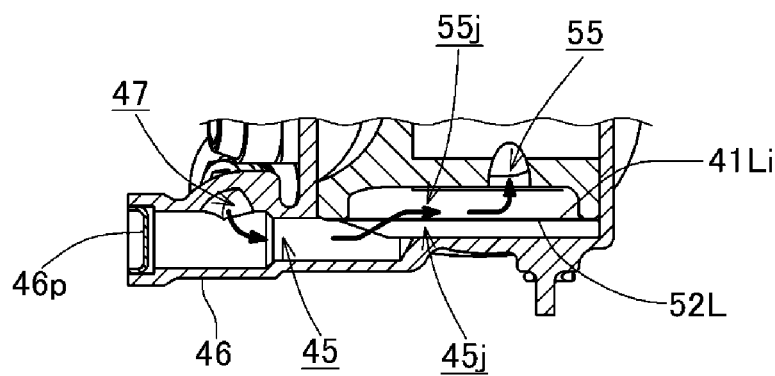
FIG. 20 is a cross-sectional view of the rotary-type throttling device, taken along line XX-XX of FIG. 19.
Figure 22:
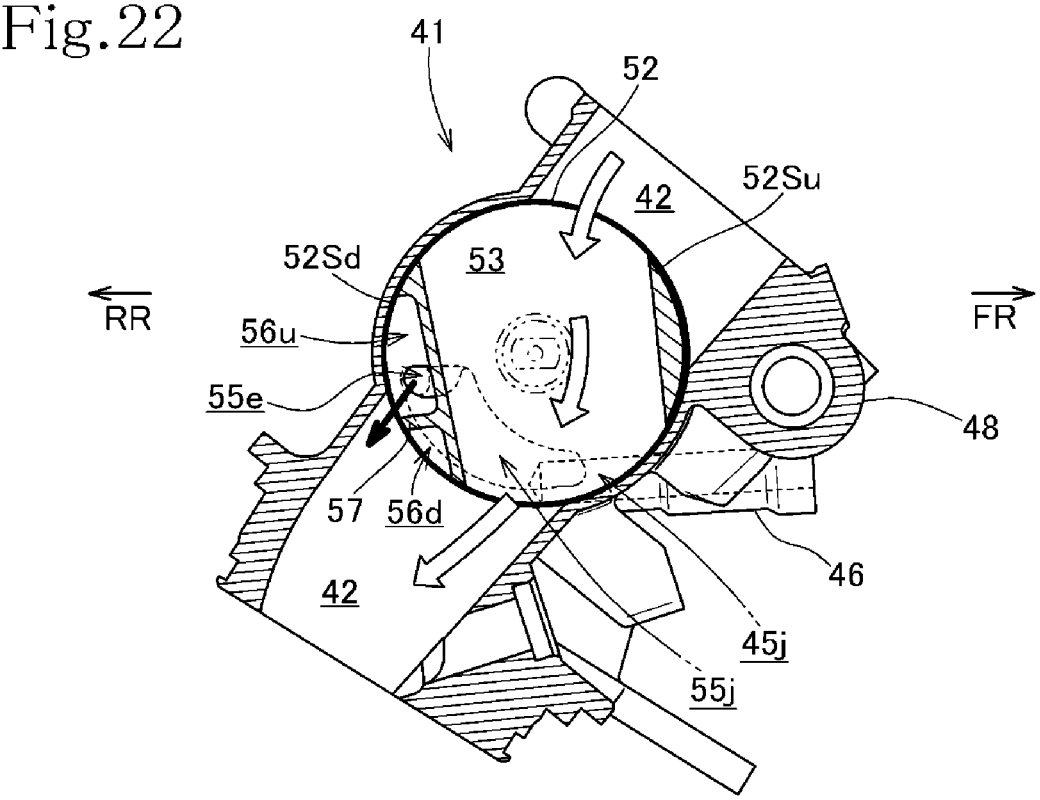
FIG. 22 is a cross-sectional view taken along the same plane as line X-X of FIG. 3, depicting the rotary-type throttling device at the time the rotary valve is in a partly open state between its fully open state and fully closed state.

Therefore, the body-side joint fluid communication port 45j and the valve-side joint fluid communication port 55j that are defined respectively in the circular side surface 41Li and the left side surface 52L, which are held in sliding contact with each other, overlap each other and are held in fluid communication with each other depending on the angle through which the cylindrical valve body 52 is rotated (see FIGS. 19, 20, and 22).

When the body-side joint fluid communication port 45j and the valve-side joint fluid communication port 55j overlap each other, the upstream auxiliary intake passageway 45 in the throttle body 41 and the downstream auxiliary intake passageway 55 in the rotary valve 51 are held in fluid communication with each other.

Figure 17:
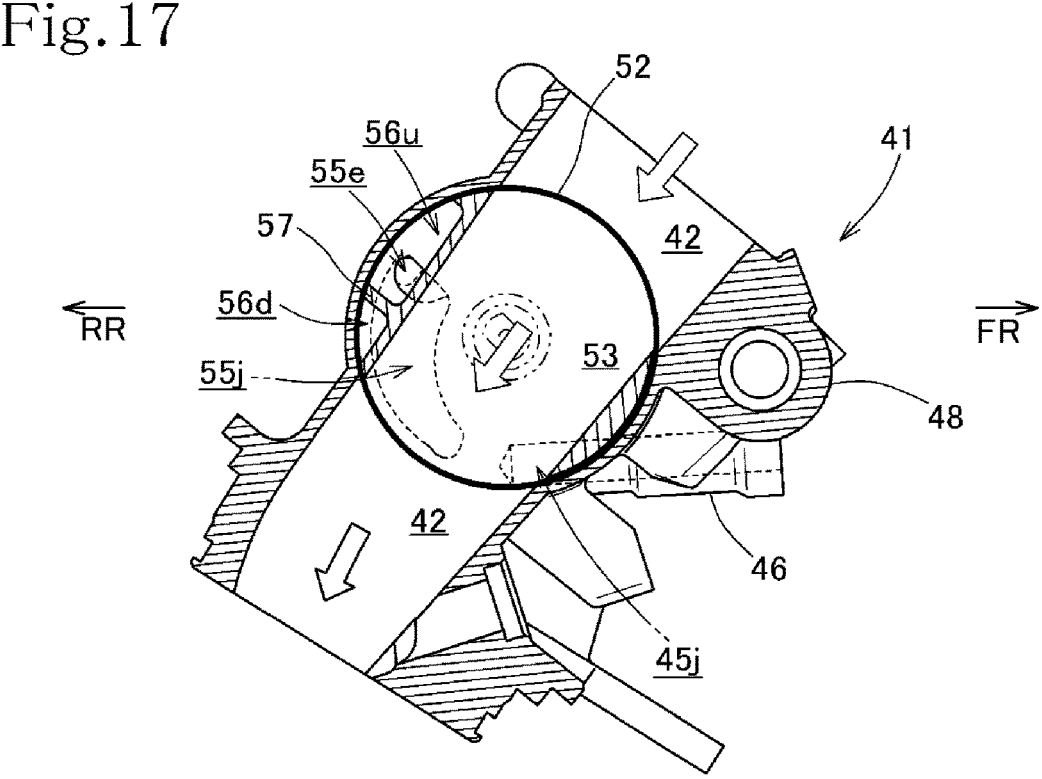
FIG. 17 is a cross-sectional view taken along the same plane as line X-X of FIG. 3, depicting the rotary-type throttling device at the time the rotary valve is fully open.
Figure 18:
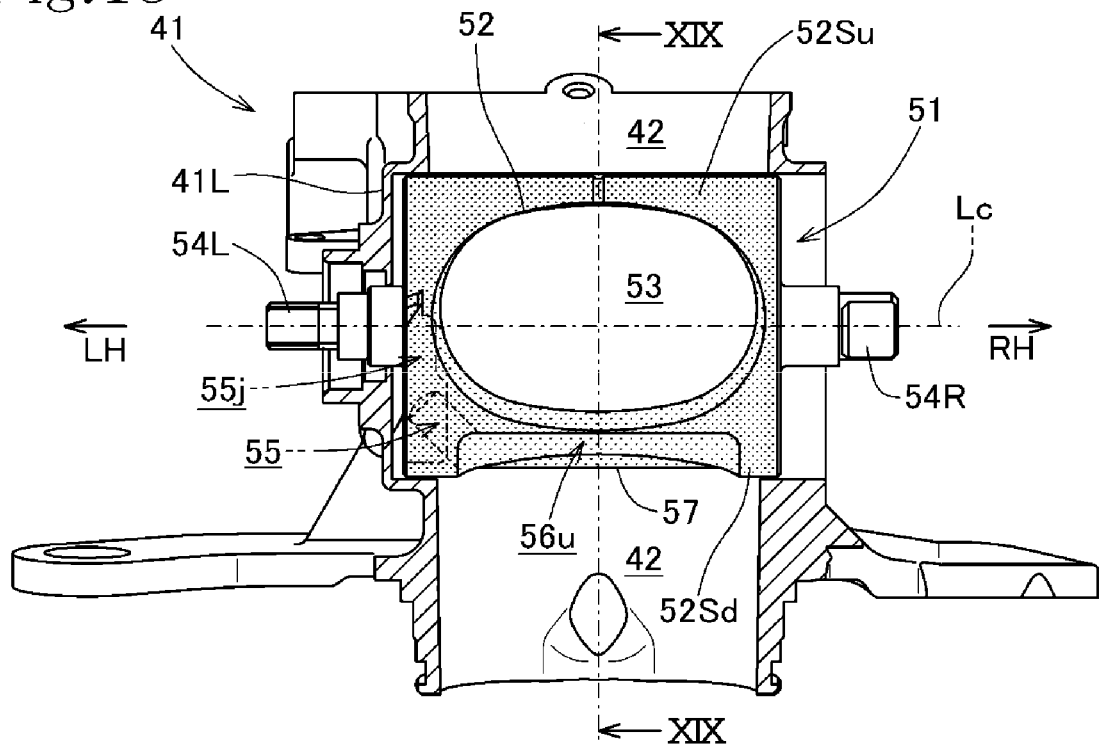
FIG. 18 is a cross-sectional view taken along the same plane as FIG. 7, depicting the rotary-type throttling device at the time the rotary valve is fully closed.

FIGS. 16 and 17 illustrate the rotary-type throttling device 40 at the time the rotary valve 51 is fully open. As depicted in these figures, the upstream outer circumferential surface 52Su and the downstream outer circumferential surface 52Sd of the cylindrical valve body 52 are concealed by the inner circumferential surface of the valve chamber 43, and the intake hole 53 in the cylindrical valve body 52 is aligned with the intake passage 42 in the throttle body 41. The rotary valve 51 is fully open, allowing main intake air stream to flow through a main intake passageway made up of the intake passage 42 and the intake hole 53 as indicated by the outlined arrows.

When the rotary valve 51 is fully open, as depicted in FIG. 17, the outlet port 55e of the downstream auxiliary intake passageway 55, which is open in the upstream recess 56u in the downstream outer circumferential surface 52Sd, is closed by the inner circumferential surface of the valve chamber 43, while the body-side joint fluid communication port 45j and the valve-side joint fluid communication port 55j that are defined in the respective sliding surfaces of the throttle body 41 and the cylindrical valve body 52 do not overlap each other, whereby the upstream auxiliary intake passageway 45 and the downstream auxiliary intake passageway 55 are held out of fluid communication with each other.

When the cylindrical valve body 52 is turned approximately 90 degrees counterclockwise from the fully open state as viewed in side elevation in FIG. 17, the rotary valve 51 is fully closed as depicted in FIGS. 18 through 21.

Specifically, the upstream outer circumferential surface 52Su of the cylindrical valve body 52 fully closes the intake passage 42 in the throttle body 41, blocking the main intake passageway.

At this time, as depicted in FIG. 19, the outlet port 55e of the downstream auxiliary intake passageway 55, which is open in the upstream recess 56u in the downstream outer circumferential surface 52Sd, is open in the intake passage 42 downstream of the cylindrical valve body 52.

Figure 21:
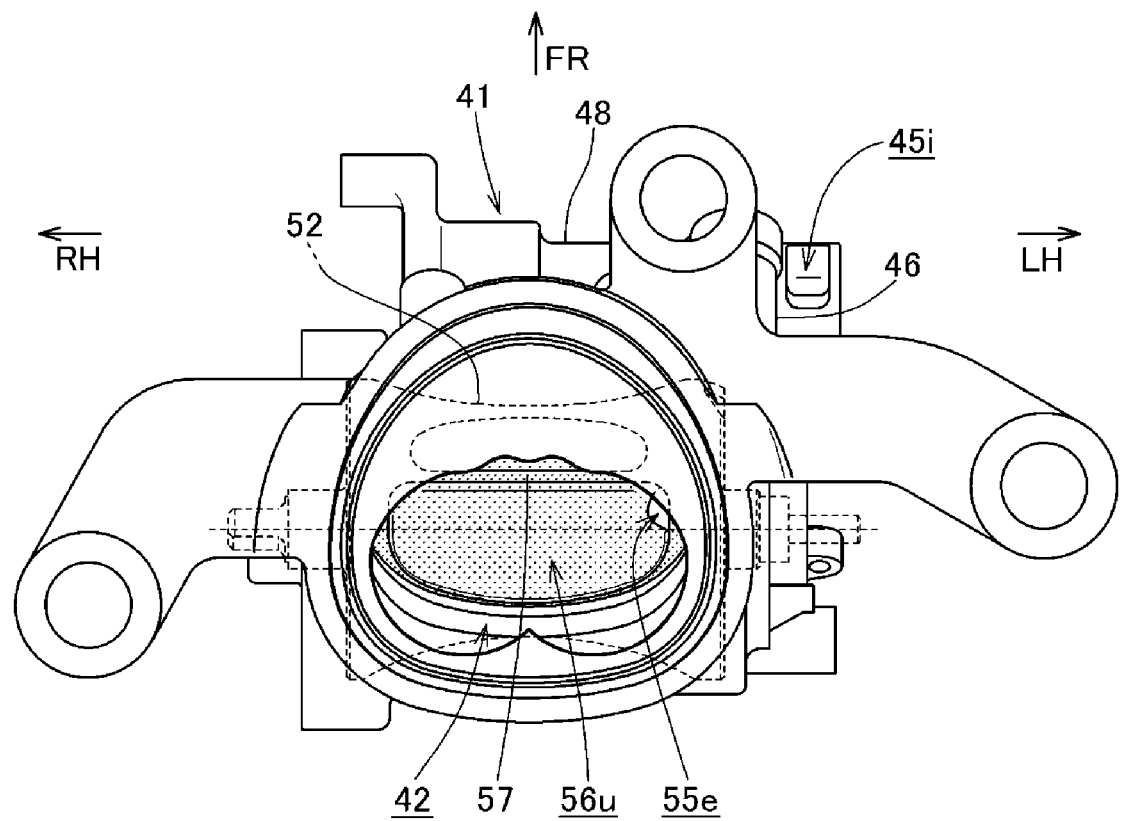
FIG. 21 is a bottom view of the rotary-type throttling device at the time the rotary valve is fully closed.

In FIG. 21, showing the intake passage 42 in the throttle body 41 as seen from the downstream side, the outlet port 55e of the downstream auxiliary intake passageway 55 is visible in the downstream opening of the intake passage 42.

At the same time, as depicted in FIGS. 19 and 20, the body-side joint fluid communication port 45j and the valve-side joint fluid communication port 55j that are defined in the respective sliding surfaces of the throttle body 41 and the cylindrical valve body 52 partly overlap each other and are held in fluid communication with each other.

Consequently, the upstream auxiliary intake passageway 45 and the downstream auxiliary intake passageway 55 are brought into fluid communication with each other, allowing an auxiliary intake air stream (indicated by the solid bold arrow in FIG. 19) to flow from the outlet port 55e of the downstream auxiliary intake passageway 55 into the downstream intake passage 42, thereby supplying ambient air to the combustion chamber 30 to enable the internal combustion engine 20 to continue operating.

This is a situation where the rotary-type throttling device 40 fully closes the rotary valve 51, keeping the internal combustion engine 20 idling.

FIG. 22 depicts the rotary-type throttling device 40 at the time the rotary valve 51 is in a partly open state between its fully open state and fully closed state. As depicted in FIG. 22, the upstream outer circumferential surface 52Su and the downstream outer circumferential surface 52Sd of the cylindrical valve body 52 are partly concealed by the inner circumferential surface of the valve chamber 43, and the opening through which the intake hole 53 in the cylindrical valve body 52 and the intake passage 42 in the throttle body 41 are held in fluid communication with each other is reduced, thereby throttling the main intake passageway.

Therefore, the main intake air stream flowing through the intake hole 53 into the downstream intake passage 42 as indicated by the outlined arrows in FIG. 22 is controlled at a given rate of intake air.

At the degree of opening of the rotary valve 51 depicted in FIG. 22, the upstream recess 56u in the downstream outer circumferential surface 52Sd of the cylindrical valve body 52 is open in the downstream intake passage 42, and the body-side joint fluid communication port 45j and the valve-side joint fluid communication port 55j, defined in the respective sliding surfaces of the throttle body 41 and the cylindrical valve body 52, partly overlap each other and are held in fluid communication with each other.

Accordingly, the upstream auxiliary intake passageway 45 and the downstream auxiliary intake passageway 55 are brought into fluid communication with each other, allowing an auxiliary intake air stream (indicated by the solid bold arrow in FIG. 22) from the outlet port 55e of the downstream auxiliary intake passageway 55 to flow from the upstream recess 56u into the downstream intake passage 42 through an opening reduced by the partition rib 57.

Since the main intake air stream flows out from the intake hole 53 into the downstream intake passage 42, and the auxiliary intake air stream flows out from the outlet port 55e that is open in the upstream recess 56u in the downstream outer circumferential surface 52Sd, which is separate from the intake hole 53 in the cylindrical valve body 52, the auxiliary intake air stream does not act directly on the main intake air stream, and hence does not disturb the main intake air stream, as will be noted from FIG. 22, so that the intake air flows smoothly for enhanced intake performance.

As the outlet port 55e of the downstream auxiliary intake passageway 55 is open in the upstream recess 56u partitioned by the partition rib 57, when the cylindrical valve body 52 is turned from the closed state toward the open state, the upstream recess 56u partitioned by the partition rib 57 is progressively closed by the inner surface of the valve chamber 43 in the throttle body 41 and the outlet port 55e that is open in the upstream recess 56u is also closed from an early stage before the rotary valve 51 reaches the fully open position, so that any adverse effect that the auxiliary intake air stream flowing out of the outlet port 55e has on the main intake air stream is further reduced.

As FIG. 22 shows, inasmuch as the downstream auxiliary intake passageway 55 in the rotary valve 51 has the outlet port 55e in the downstream outer circumferential surface 52Sd of the cylindrical valve body 52, when the rotary valve 51 is turned into the open state, the auxiliary intake air stream flows out of the outlet port 55e defined in the downstream outer circumferential surface 52Sd that is separate from the intake hole 53 in the cylindrical valve body 52. Therefore, the auxiliary intake air stream flowing out of the outlet port 55e does not act directly on the main intake air stream flowing through the intake hole 53 in the cylindrical valve body 52 and the intake passage 42, and does not disturb the main intake air stream, whereby the intake air stream smooth is made smooth for enhanced intake performance.

As depicted in FIG. 20, the body-side joint fluid communication port 45j and the valve-side joint fluid communication port 55j that provide fluid communication between the upstream auxiliary intake passageway 45 in the throttle body 41 and the downstream auxiliary intake passageway 55 in the rotary valve 51 are defined respectively in the inner side surface 41Li of the valve chamber 43 of the throttle body 41 and the axial side surface (left side surface 52L) of the cylindrical valve body 52 of the rotary valve 51, and the inner side surface 41Li and the left side surface 52L are held in sliding contact with each other. Therefore, as will be noted from FIGS. 11 and 14, the valve-side joint fluid communication port 55j defined in the left side surface 52L of the cylindrical valve body 52 can be freely placed at an optimum position, without being affected by the intake hole 53, in the left side surface 52L as the axial side surface, rather than in the outer circumferential surface 52S in which the intake hole 53 is formed, and the valve-side joint fluid communication port 55j can have a sufficient area for an increased rate of auxiliary intake air.

As depicted in FIG. 22, the depressed upstream recess 56u is defined in the downstream outer circumferential surface 52Sd of the cylindrical valve body 52 of the rotary valve 51, and the outlet port 55e of the downstream auxiliary intake passageway 55 is open in the upstream recess 56u in the downstream outer circumferential surface 52Sd. For this reason, the auxiliary intake air stream flowing through the downstream auxiliary intake passageway 55 out of the outlet port 55e flows into the upstream recess 56u defined in the downstream outer circumferential surface 52Sd of the cylindrical valve body 52. Therefore, any adverse effect that the auxiliary intake air stream has on the main intake air stream flowing through the intake hole 53 in the cylindrical valve body 52 and the intake passage 42 is further reduced, making the intake air stream smooth for enhanced intake performance.

Further, as the outlet port 55e of the downstream auxiliary intake passageway 55 is open in the upstream recess 56u, the passageway length of the downstream auxiliary intake passageway 55 is shortened for smooth fluid communication with the intake passage 42 to stabilize intake performance when the rotary valve 51 has no valve opening, i.e., when the rotary valve 51 is closed, and when the rotary valve has a minute opening.

Still referring to FIG. 22, the outlet port 55e of the downstream auxiliary intake passageway 55 is open in the upstream recess 56u partitioned by the partition rib 57, when the cylindrical valve body 52 is turned from the closed state toward the open state. Consequently, the upstream recess 56u partitioned by the partition rib 57 is progressively closed by the inner surface of the valve chamber 43 in the throttle body 41, and the outlet port 55e that is open in the upstream recess 56u is also closed from an early stage before the rotary valve 51 is fully open, so that the auxiliary intake air stream flowing out of the outlet port 55e is further prevented from acting on and disturbing the main intake air stream flowing through the intake hole 53 in the cylindrical valve body 52 and the intake passage 42, for further enhancing intake performance.

As depicted in FIGS. 11 and 15, the downstream auxiliary intake passageway 55 in the rotary valve 51 is defined through the solid portion of the cylindrical valve body 52, providing fluid communication between the valve-side joint fluid communication port 55j and the outlet port 55e. Therefore, the downstream auxiliary intake passageway 55 is defined without forming a recess in the outer surface of the cylindrical valve body 52, so that the cylindrical valve body 52 and the inner surface of the valve chamber 43 in the throttle body 41 are well sealed against each other while at the same time the rotary valve 51 remains highly operative.

As depicted in FIGS. 5 and 8, inasmuch as the auxiliary intake control valve device 50 for controlling the auxiliary intake air stream flowing from the outlet port 55e of the downstream auxiliary intake passageway 55 in the rotary valve 51 is provided in combination with the upstream auxiliary intake passageway 45 in the throttle body 41, the auxiliary intake control valve device 50 can be installed with ease and can be operated stably.

The rotary-type throttling device for the internal combustion engine according to the embodiment of the present invention has been described above. However, the present invention is not limited to the above embodiment, but various changes and modifications may be made therein within the scope of the invention.

For example, the vehicle on which the rotary-type throttling device of the invention is mounted is not limited to the saddle-type motorcycle 1 according to the illustrated embodiment, but may be any of various types of saddle-type vehicles including scooter-type vehicles, three- or four-wheeled buggies, etc., insofar as they are vehicles with requirements defined in the claims.

DESCRIPTION OF REFERENCE SYMBOLS

1 . . . Motorcycle, 2 . . . Head pipe, 3 . . . Main frame, 4 . . . Pivot frame, 5 . . . Seat rail, 6 . . . Subframe, 8 . . . Steering shaft, 9 . . . Front fork, 10 . . . Front wheel, 11 . . . Handlebar, 13 . . . Swing arm, 14 . . . Rear wheel, 15 . . . Fuel tank, 16 . . . Rider's seat, 20 . . . Internal combustion engine, 21 . . . Crankcase, 22 . . . Cylinder block, 23 . . . Cylinder head, 24 . . . Cylinder head cover, 25 . . . Crankshaft, 26 . . . Piston, 27 . . . Connecting rod, 30 . . . Combustion chamber, 31 . . . Intake port, 32 . . . Exhaust port, 33 . . . Intake valve, 34 . . . Exhaust valve, 35 . . . Intake camshaft, 36 . . . Exhaust camshaft, 38 . . . Exhaust pipe, 40 . . . Rotary-type throttling device, 41 . . . Throttle body, 42 . . . Intake passage, 43 . . . Valve chamber, 45 . . . Upstream auxiliary intake passageway, 45$i$ . . . Inlet port, 45$j$ . . . Body-side joint fluid communication port, 46 . . . Passage tube, 47 . . . Fluid communication passage, 48 . . . Solenoid valve housing tube, 50 . . . Auxiliary intake control valve device, 50S . . . Electromagnetic solenoid, 50$r$ . . . Operating rod, 50$v$ . . . Slidable valve body, 51 . . . Rotary valve, 52 . . . Cylindrical valve body, 52S . . . Outer circumferential surface, 52Su . . . Upstream outer circumferential surface, 52Sd . . . Downstream outer circumferential surface, 52L . . . Left side surface, 52R . . . Right side surface, 53 . . . Intake hole, 54L, 54R . . . Pivot shaft, 55 . . . Downstream auxiliary intake passageway, 55$j$ . . . Valve-side joint fluid communication port, 55$e$ . . . Outlet port, 56$u$ . . . Upstream recess, 56$d$ . . . Downstream recess, 57 . . . Partition rib, 71 . . . Funnel, 72 . . . First fuel injection valve, 73 . . . Second fuel injection valve, 74 . . . Support rod, 75 . . . Intake box.

The invention claimed is:

1. A rotary-type throttling device for an internal combustion engine, comprising:
 a rotary valve including a valve body having a cylindrical body with a longitudinal center axis about which the cylindrical body is swingable between open and closed positions, and an intake hole defined in the cylindrical body and extending perpendicularly across the center axis; and
 a throttle body having an intake passage defined therein which is held in fluid communication with an intake channel in the internal combustion engine and a cylindrical valve chamber defined therein to extend perpendicularly across the intake passage, the cylindrical valve chamber receiving therein said cylindrical valve body to be rotatable relative to the cylindrical valve chamber,
  wherein the valve body of the rotary valve is rotatable between the open position in which the intake hole of the rotary valve is brought into fluid communication with the intake passage of the throttle body and the closed position in which an outer circumferential surface of the cylindrical valve body closes the intake passage,
  wherein said throttle body has an upstream auxiliary intake passageway defined therein, having an inlet port held in fluid communication with the atmosphere,
  wherein said cylindrical valve body has a downstream outer circumferential surface and a downstream auxiliary intake passageway defined therein, the downstream auxiliary intake passageway having an outlet port opening at the downstream outer circumferential surface,
  wherein said upstream auxiliary intake passageway and said downstream auxiliary intake passageway have a body-side joint fluid communication port and a valve-side joint fluid communication port defined in respective relative sliding surfaces of said throttle body and said cylindrical valve body, said body-side joint fluid communication port and said valve-side joint fluid communication port being arranged to be capable of overlapping each other for fluid communication with each other, and
  wherein said valve-side joint fluid communication port is formed in an axial side surface of said cylindrical valve body, and said body-side joint fluid communication port is formed in an inner side surface of said cylindrical valve chamber of the throttle body which is held in sliding contact with said axial side surface,
  wherein said downstream outer circumferential surface of the cylindrical valve body has therein a recess divided by a partition rib into an upstream recess and a downstream recess, and said outlet port of the downstream auxiliary intake passageway is open in said upstream recess, and
  wherein when the rotary valve is initially opened, the body-side joint fluid communication port partly overlaps with the valve-side joint fluid communication port to allow an auxiliary intake air stream from the outlet port to flow from the upstream recess into the downstream intake passage through an opening reduced by said partition rib.

2. The rotary-type throttling device for an internal combustion engine according to claim 1, wherein said recess defined in said downstream outer circumferential surface of the cylindrical valve body is divided into said upstream recess section and said downstream recess section, in the open position of said cylindrical valve body, by said partition rib extending parallel to said center axis, and wherein said outlet port of said downstream auxiliary intake passageway is open in said upstream recess.

3. The rotary-type throttling device for an internal combustion engine according to claim 1, wherein said downstream auxiliary intake passageway of the rotary valve is formed through a solid portion of said cylindrical valve body and provides fluid communication between said valve-side joint fluid communication port and said outlet port.

4. The rotary-type throttling device for an internal combustion engine according to claim 1, wherein said upstream auxiliary intake passageway of the throttle body is combined with an auxiliary intake control valve device for controlling the amount of auxiliary intake air flow therethrough depending on degree of opening of the rotary valve.

5. The rotary-type throttling device for an internal combustion engine according to claim 2, wherein said downstream auxiliary intake passageway of the rotary valve is formed through a solid portion of said cylindrical valve body and provides fluid communication between said valve-side joint fluid communication port and said outlet port.

6. The rotary-type throttling device for an internal combustion engine according to claim 2, wherein said upstream auxiliary intake passageway of the throttle body is combined with an auxiliary intake control valve device for controlling the amount of auxiliary intake air flow therethrough depending on degree of opening of the rotary valve.

7. The rotary-type throttling device for an internal combustion engine according to claim 3, wherein said upstream auxiliary intake passageway of the throttle body is combined with an auxiliary intake control valve device for controlling the amount of auxiliary intake air flow therethrough depending on degree of opening of the rotary valve.

* * * * *